United States Patent [19]

Hoebrechts et al.

[11] 4,118,825
[45] Oct. 10, 1978

[54] CONNECTOR ASSEMBLY FOR WINDSHIELD WIPERS

[75] Inventors: Albert J. G. Hoebrechts, Mechelen Bovelingen; Alex H. A. M. van Eekelen, Hasselt, both of Belgium

[73] Assignee: Monroe Auto Equipment Company, Monroe, Mich.

[21] Appl. No.: 782,096

[22] Filed: Mar. 28, 1977

[51] Int. Cl.² ............................................. B60S 1/40
[52] U.S. Cl. .............................. 15/250.32; 15/250.42
[58] Field of Search ........... 15/250.32, 250.33, 250.34, 15/250.35, 250.31, 250.42

[56] References Cited

U.S. PATENT DOCUMENTS

| 3,843,994 | 10/1974 | Smithers | 15/250.32 |
| 3,864,783 | 2/1975 | Arman | 15/250.32 |
| 3,866,260 | 2/1975 | Cone | 15/250.32 |
| 4,023,232 | 5/1977 | Smithers | 15/250.32 |

FOREIGN PATENT DOCUMENTS

| 2,251,502 | 5/1973 | Fed. Rep. of Germany | 15/250.32 |
| 2,340,481 | 2/1975 | Fed. Rep. of Germany | 15/250.32 |

Primary Examiner—George F. Mautz
Attorney, Agent, or Firm—Harness, Dickey & Pierce

[57] ABSTRACT

A connector assembly for operatively connecting a windshield wiper arm to the superstructure of an associated wiper blade having a yoke member comprising a pair of spaced apart side sections and intermediate web section, the connector assembly including an opening formed in the web section and a pair of laterally aligned apertures formed in the side section of the superstructure, the terminal end of the wiper arm defining an opening adapted to be aligned with the apertures of the superstructure, a removable connector pin extending coaxially of the apertures and the opening for connecting the yoke member to the arm, and an insert member received at least in part within the opening of the yoke member and releasably connected to the pin, whereby the pin may be removed from the assembly in order to disconnect the blade from the arm.

19 Claims, 13 Drawing Figures

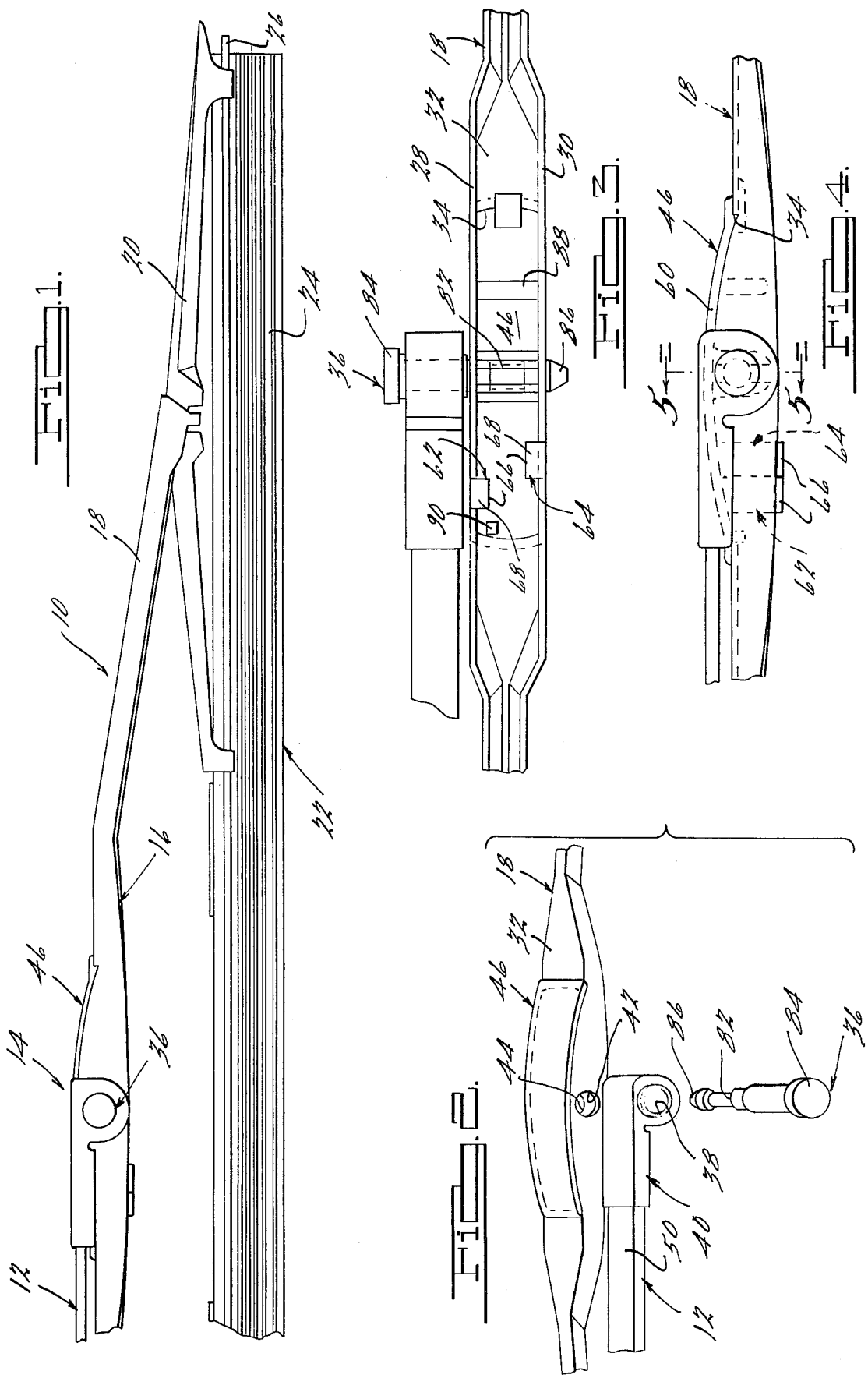

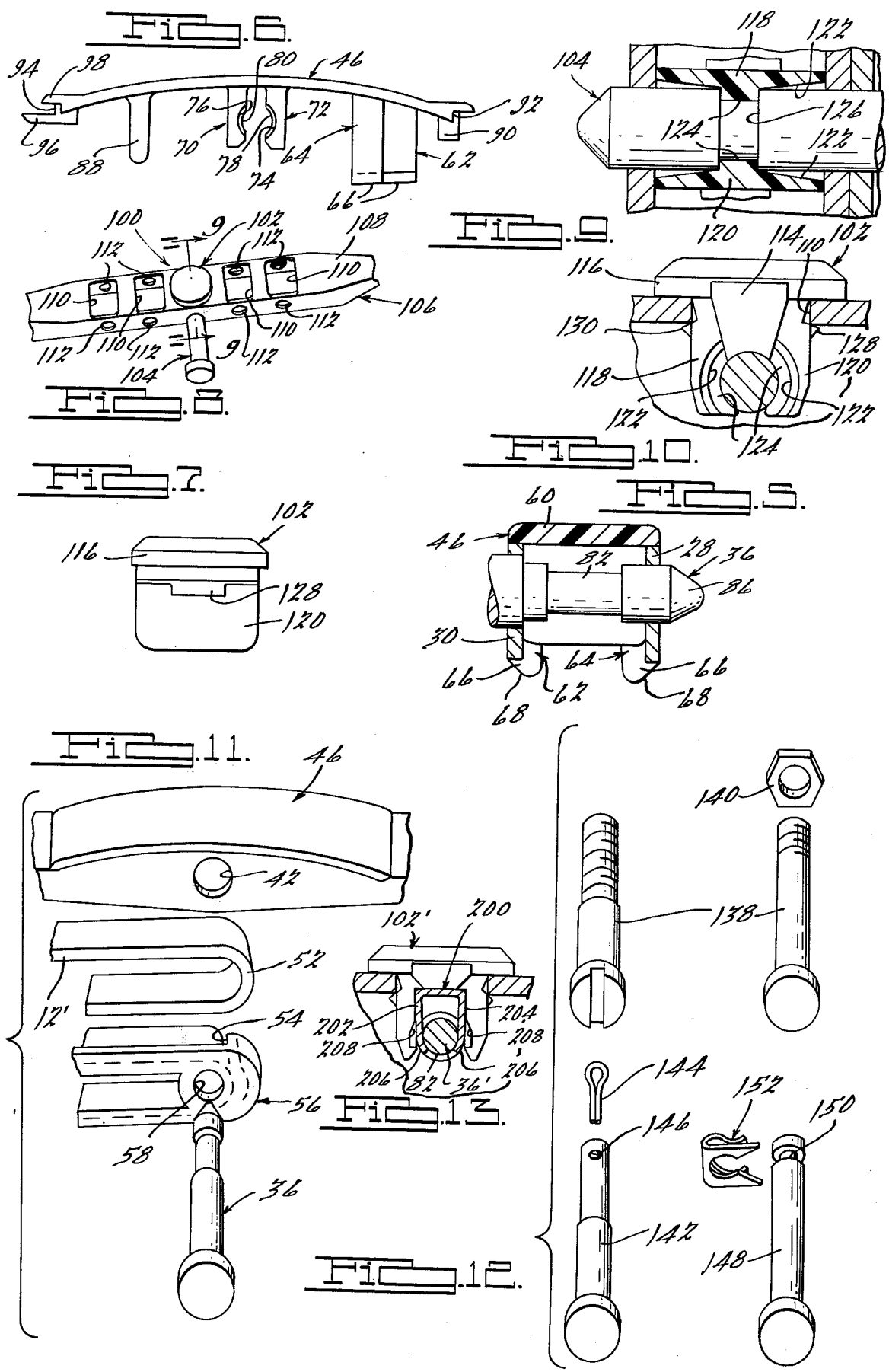

CONNECTOR ASSEMBLY FOR WINDSHIELD WIPERS

SUMMARY OF THE INVENTION

This invention relates generally to windshield wiper blades for automotive vehicles, and more particularly, to a new improved connector assembly for operatively connecting windshield wiper blade assemblies to associated wiper arms.

It is accordingly a general object of the present invention to provide a new and improved connector assembly for operatively connecting windshield wiper blade assemblies to their associated wiper arms.

It is a more particular object of the present invention to provide a new and improved connector assembly of the above-described type which is of the side mounted pin type wherein a laterally extending pin is utilized for operatively securing the outer or terminus end of the wiper arm to a central portion of the blade assembly.

It is a more particular object of the present invention to provide a new and improved connector assembly, as above described, wherein the pin is removable in order to effect disassembly of the blade from the wiper arm.

It is a further object of the present invention to provide a new and improved connector assembly which utilizes a removably mounted insert member that is located centrally of the wiper blade superstructure and is adapted to detachably or removably engage the transversely extending pin.

It is yet another object of the present invention to provide a new and improved connector assembly of the above-described type wherein the insert member is fabricated of a molded plastic material, and wherein the pin may be fabricated of different designs for accommodating different types of wiper arm end fittings.

It is a related object of the present invention to provide a new and improved connector assembly wherein the insert member may be mounted at selected positions along the wiper blade superstructure so as to provide for on-center and off-center application.

It is still another object of the present invention to provide a new and improved connector assembly, as described above, wherein the pin may be detachably connected by means of the insert member or instead, may utilize a threaded aperture and/or anciliary fastening devices such as cotter pins or circlips.

It is a further object of the present invention to provide a new and improved connector assembly of the above character that may be provided with an anti-wear clip for certain desired applications.

It is yet another object of the present invention to provide a new and improved connector assembly which will find universality of application with various types wiper blades and wiper arms.

It is still a further object of the present invention to provide a new and improved connector assembly of the above-described type which may be economically manufactured, and will have a long and effective operational life.

Other objects and advantages of the present invention will become apparent from the following detailed description taken in conjunction with the accompanying drawings.

BRIEF DESCRIPTION OF THE DRAWINGS

FIG. 1 is an enlarged fragmentary side elevational view of a vehicle windshield wiper blade assembly and an associated wiper arm which are connected in accordance with the principles of the present invention;

FIG. 2 is an exploded assembly view of one preferred embodiment of the connector assembly of the present invention;

FIG. 3 is a bottom elevational view of the connector assembly of the present invention, as shown in operative association with a fragmentary portion of the associated wiper arm and wiper blade superstructure;

FIG. 4 is an enlarged fragmentary side elevational view of the structure shown in FIG. 3;

FIG. 5 is a transverse cross-sectional view taken substantially along the line 5—5 of FIG. 4;

FIG. 6 is a side elevational view of the insert element embodied in one preferred embodiment of the present invention;

FIG. 7 is a side elevational view of an alternate embodiment of the insert member incorporated in the present invention;

FIG. 8 is an elevated fragmentary perspective view of the insert member shown in FIG. 7 shown in operative association with a portion of a wiper blade superstructure;

FIG. 9 is an enlarged transverse cross-sectional view taken substantially along the line 9—9 of FIG. 8;

FIG. 10 is an enlarged fragmentary side elevational view of the connector assembly shown in FIGS. 8 and 9;

FIG. 11 is an exploded assembly view of the present invention, as shown in operative association with an alternate wiper arm end portion and end fitting;

FIG. 12 is an elevated perspective view of a plurality of alternate connector pins which may be utilized with the present invention; and FIG. 13 is a fragmentary cross-sectional view of yet another alternate embodiment of the present invention.

DETAILED DESCRIPTION OF THE PREFERRED EMBODIMENTS

Referring now in detail to the drawings and in particular in FIG. 1 thereof, a windshield wiper assembly 10, in accordance with one preferred embodiment of the present invention, is shown in operative association with a typical windshield wiper arm 12 which is connected via a connector assembly of the present invention, generally designated by the numeral 14, to the superstructure 16 of the wiper assembly 10. As is well known in the art, the superstructure 18 comprises a primary yoke member 18 which is connected at the opposite end thereof to a pair of secondary yoke members 20 (only one of which is shown herein), the opposite ends of the secondary yoke member(s) 20 being connected to a wiper blade assembly which is generally designated by the numeral 22. The assembly 22 typically consists of a conventional rubber wiping member 24 which is secured to a coextensive elongated flexible element or flexor 26 with which the claw-like ends of the secondary yoke members 20 are engaged.

As best seen in FIGS. 1-4, the central portion of the primary yoke member 18 comprises a pair of spaced parallel side sections 28, 30, and a top section 32 that defines a central opening 34 which extends between the side sections 28, 30. Generally speaking, the wiper arm 12 is connected to the central portion of the primary yoke member 18 by means of a transversely extending connector pin, generally designated by the numeral 36. The connector pin 36 is adapted to extend through a suitably shaped aperture 38 provided in an end fitting 40 secured to the terminus end 50 of the arm 12, as best seen in FIG. 2. The pin 36 also extends through a pair of laterally or transversely aligned apertures 42 and 44 formed in the side sections 30, 28, respectively, of the yoke member 18 and is adapted to be retained therein, and thus secure the entire superstructure 16 to the wiper arm 12, by means of an insert element, generally designated by the numeral 46, which is detachably secured on the upper side of the yoke member 18 and has a portion thereof extending downwardly through the central opening 34 formed therein.

The insert element 46 may take any one of a number of forms, two preferred of which forms are disclosed herein and will hereinafter be described. Preferably, the element 46 is fabricated of a molded plastic material and has sufficient flexibility so as to permit convenient installation and removal from the opening 34 and so as to facilitate insertion and removal of the pin 36 for attaching and detaching the wiper assembly 10 from the wiper arm 12, as will hereinafter be described. Before describing the detailed construction of the insert element 46, however, it is to be noted that the end fitting 40 mounted on the terminus end 50 of the wiper arm 12 may also take any one of a number of different forms. It is to be noted that the end fitting 40 may be adapted for wiper arms having a straight or linear terminus end 50, or alternatively, as shown in FIG. 11, a wiper arm 12' may be provided with a generally hooked-shaped terminus end portion 52 which is adapted to be nestingly received within a complementary U-shaped slot or recess 54 of an end fitting 56 having an aperture 58 analogous to the aforementioned aperture 38 adapted to have the connector pin 36 inserted therethrough. Of course, various other types of end fittings may be utilized with the principles of the present invention and the claims appended hereto are in no way intended to be limited to the particular types of end fittings 40 and 56 disclosed herein.

Referring now in detail to the construction of the insert element 46, as best seen in FIG. 6, the element comprises a generally arcuate-shaped body 60 having a pair of downwardly extending leg sections 62 and 64 formed integrally thereof. The leg sections 62, 64, as seen in FIG. 5, comprise laterally outwardly projecting feet portions 66 which are formed on the lower sides thereof with inclined camming surfaces or faces 68. Upon insertion or assembly of the insert member 46 onto the primary yoke member 18, the leg sections 62, 64 are adapted to be biased laterally inwardly as the faces 68 thereof engage the upper edges of the side sections 28, 30. Downward movement of the element 48 to the fully assembled position shown in FIG. 4 will result in the leg sections 62, 64 moving to the position shown in FIG. 5 wherein the feet portions 66 thereof engage the underside of the side sections 28, 30 for securing the insert element 46 in place.

As also best seen in FIG. 6, the underside of the insert element 46 is formed with a pair of downwardly extending pin retainer elements 70 and 72 which define confronting semi-circular recesses 74, 76, respectively. The recesses 74, 76 define inwardly projecting semi-circular bosses 78, 80 which are adapted to be nestingly received within an annular recessed section 82 of the connector pin 36. As shown in FIG. 2, the pin 36 also comprises an enlarged diameter head portion 84 at one end thereof and a generally tapered terminal end portion 86 at the opposite end thereof. As will be appreciated by those skilled in the art, the retainer elements 70, 72 are of a relatively flexible nature and are adapted to be biased apart upon insertion of the pin 36 through the apertures 42, 44 until such time as the bosses 78, 80 become axially aligned with the recess 82 of the pin 36, whereupon the resilience of the elements 70, 72 will cause the bosses 78, 80 to move into engagement with the recess 82 to positively retain the pin 36 in place.

The underside of the insert element body 60 is formed with a pair of positioning elements 88 and 90, the former of which extends generally transversely of the body 60 approximately the entire width between the side sections 28, 30 of the yoke member 18. The other of the positioning elements 90 extends longitudinally of the body 60 and is located adjacent the same end of the element 46 as the leg sections 62, 64 and is adapted to operatively engage one end of the central opening 34 formed in the yoke member 18. The body 60 is also formed with a transversely extending shoulder 92 adjacent the longitudinal positioning element 90 and the opposite end of the body 60 is formed with a laterally extending recess 94 which is defined between a locking flange 96 and a tab portion 98 which functions in a manner hereinafter to be described in operatively securing the insert element 46 on the yoke member 18.

At such time as it is desired to insert the element 46 into the opening 34 of the yoke member 18, the element 46 is oriented such that the locking flange 96 is hooked or otherwise engaged at one end of the opening 34 beneath the top section 32. The opposite end of the element 46 is thereafter pivoted or biased downwardly, whereupon the leg sections 62, 64 will be biased or flexed inwardly as the camming surfaces or faces 68 thereof engage the upper edges of the side sections 28, 30. Further downward movement of the opposite end of the element 46 will result in the feet portions 66 of the leg sections 62, 64 being resiliently biased outwardly to engage the underside of the side sections 28, 30 and the positioning element 90 engaging the opposite end of the opening 34 whereupon the element 46 will be positively secured in place. At such time as it is desired to remove the element 46 from the opening 44, the leg sections 62, 64 may be biased laterally inwardly to disengage the feet portions 66 from the side sections 28, 30, whereupon the end of the body 60 opposite the recess 94 may be pivoted upwardly to a position wherein the leg sections 62, 64 are disengaged from the side sections 28, 30. Thereafter, the entire element 46 may be moved longitudinally of the yoke member 18 to effect disengagement of the recess 94 from the top section 32 thereof.

FIGS. 7-10 illustrate an alternative embodiment of the present invention wherein a connector assembly, generally designaed by the numeral 100, is shown as comprising an insert member 102 that is operatively associated with a connector pin 104 which is intended to be cooperative with an end fitting on an associated wiper arm of the type hereinabove described. The pin 104 and insert member 102 are cooperable with a windshield wiper assembly superstructure, representatively designated by the numeral 106, which comprises a central section 108 defining a plurality of longitudinally spaced generally rectangular openings 110 that are preferably identical in size and shape. The central section 108 of the superstructure 106 is also formed with a plurality of pairs of openings 112 analogous to the aforedescribed openings 42 and 44, which openings 112 are aligned one pair with each of the openings 110, as best see in FIG. 2. The insert member 102 is adapted to be selectively mounted or inserted in a particular opening 110 and be operatively associated with the adjacent pair of openings 112 such that the connector pin 104 may extend laterally through the openings 112 and be secured to the superstructure 106 by means of the insert member 102. The particular opening 110 with which the insert member 102 is associated may be varied in accordance with the particular length of the associated wiper arm, the shape of the associated windshield and the particular wiping characteristics desired, as will be appreciated by those skilled in the art.

As best seen in FIG. 7, the insert member 102 comprises a body 114 having an enlarged head portion 116 which is slightly larger in cross-sectional shape than the opening 110. Extending downwardly from the head 116 is a pair of arcuate fingers 118 and 120 which, as best seen in FIG. 10, are formed with confronting semicircular recesses 122 that define inwardly projecting semicircular bosses 124 analogous to the bosses 78, 80 hereinabove described. As will be appreciated, the bosses 124 are adapted to be nestingly received within an annular recess 126 formed in the connector pin 104 for detachably securing the pin to the wiper superstructure 106 and hence for securing the entire wiper blade assembly to the associated wiper arm.

Formed on the opposite sides of the arcuate fingers 118, 120 from the bosses 124 is a pair of retaining shoulders 128 and 130. The shoulders, as seen in FIG. 10, are adapted to engage the underside of the top of the wiper superstructure for selectively retaining the insert member 102 within its associated opening 110 therein. At such time as the pin 104 is removed, the fingers 118, 120 may be biased together, thereby causing the shoulders 128, 130 to become disengaged from the underside wiper superstructure top section to permit the entire insert member 102 to be removed from the opening 110, as will be appreciated by those skilled in the art.

It is to be noted that for certain types of applications, instead of the connector pins, such as the pins 36 and 104 described herein, a suitable threaded screw-like member 138 shown in FIG. 12 may be utilized, with the insert member having a suitable internally threaded bore adapted to engage the threaded shank of the screw. Alternatively, a suitable threaded nut may be operatively associated with the screw for securing the same in place. A connector element such as is indicated at 142 may also be utilized and have a crossbore 146 adapted to cooperate with a suitable cotter-type locking pin 144. Instead of the pin 144, a circlip-type device 152 could be operatively associated with a connector pin 148 having a suitable circlip receiving recess 150 therein. Of course, various other type connector elements could be used without departing from the scope or fair meaning of the present invention.

FIG. 13 illustrates a slightly modified embodiment of the present invention wherein an insert member 102' is shown provided with an anti-wear clip 200 adapted to be interposed between the outer periphery of the pin 36' and the confronting semi-circular recesses 122 in order to prevent undesirable wear on the surfaces of the fingers 118, 120. The clip 200 is shown as comprising a pair of downwardly extending leg portions 202 and 204 having sections 206 received within the recess 82 of the associated pin 36' and portions 208 adapted to be nestingly received within complementary-shaped recesses of the fingers 118, 120. The clip 200 will find particularly useful application where the insert member 102' is fabricated of a molded plastic material or the like which might have a tendency to wear excessively upon relative pivotal movement of the pin 36' with respect thereto. In such an application, the clip may be fabricated of any suitable metal or possibly a more wear resistant plastic material, depending upon the particular application.

It will be seen from the foregoing that the present invention provides a novel connector assembly by which windshield wiper blade assemblies may be conveniently removably secured to associated wiper arm ends. By virtue of the fact that the connector pin is easily removable and the fact that the insert element per se may be conveniently removed from the associated wiper blade superstructure, disassembly and re-assembly thereof may be accomplished with a minimum amount of time and effort. It is to be noted that the connector pins may be disconnected from the insert members in either one of two ways. First of all, the pin may be axially withdrawn from between the retaining portions of the insert member and the aligned apertures formed in the superstructure side sections, or alternatively, the insert member per se may be biased upwardly, whereupon the retaining portions thereof will become disengaged from the opposite sides of the pin, whereupon the pin may be removed by axially withdrawing the same. It will also be noted that by virtue of the fact that the connector pin and insert member may be operatively associated with various types of wiper arm end fittings, the invention will find universality of application with various types of wiper arms and that such universality of application may be extended by varying the diameter and axial length of different portions of the connector pin in order to accommodate connecting different types of wiper arm end fittings. Moreover, since no special tooling is required in order to effect convenient changing of the wiper blade assembly, such interchanging or removing of wiper blades for purposes of inspection, repair, etc., may be conveniently accomplished. Another particularly important feature of the present invention resides in the fact that by virtue of the provision of a plurality of the openings 110, the wiper blade assembly may be mounted not only on center but also off center. This is an extremely important feature in view of the fact that a number of applications presently exist requiring off-center mounting of a wiper blade and that while there exists certain on-center mountings as well as off-center mountings, there is no single mounting structure which provides for the attachment of a wiper blade assembly to a new wiper arm for both off and on-center applications. Yet another feature of the present invention resides in the fact that since the insert member is fabricated of a molded plastic material, it may be impregnated with a suitable pigmented material so as to assume any desired color for purposes of product identification, trademark, size and style coding, or other suitable purpose.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

We claim:

1. A connector assembly for operatively connecting a windshield wiper arm to the superstructure of an associated wiper blade having a yoke member comprising a central portion of generally inverted U-shaped cross section defining a pair of spaced apart generally parallel side sections and an upper transversely extending intermediate web section, said assembly comprising an opening formed in the web section and a pair of laterally aligned apertures formed in the side sections, means on the terminal end of said wiper arm defining an opening adapted to be aligned with said aligned apertures when said terminal end of said wiper arm is juxtapositioned along the outer side of one of said side sections of said yoke, a removably mounted connector pin extending coaxially of said apertures for connecting said yoke member to said arm, and an insert member having a longitudinally disposed upper portion arranged to cover said opening and a pair of cooperative downwardly projecting retaining fingers located between said side sections of said yoke and on the longitudinally opposite sides of said aligned apertures, said fingers being clampingly securable to diametrically opposite sides of the portion of said pin disposed between said side sections of said yoke to prevent axial withdrawal of said pin and inadvertent disassembly of said arm from said wiper blade.

2. The invention as set forth in claim 1 wherein said yoke member is formed with a plurality of openings along the web section thereof, each of which is cooperative with a pair of laterally aligned apertures formed in said side section and through which said pin may extend.

3. The invention as set forth in claim 1 wherein said insert member is fabricated of a molded plastic material.

4. The invention as set forth in claim 1 wherein said insert member is formed with a pair of retaining legs adapted for engagement with said yoke for securing said insert member in said opening thereof.

5. The invention as set forth in claim 4 wherein each of said retaining legs has an outwardly projecting shoulder portion adapted to engage a lower edge of said side sections of said yoke for securing said insert member thereto.

6. The invention as set forth in claim 1 wherein said fingers include shoulder means adapted to engage said yoke member for securing said insert member thereto.

7. The invention as set forth in claim 1 wherein said connector pin is formed with an annular recess, and wherein said fingers releasably engage said recess in order to secure said pin to said assembly.

8. The invention as set forth in claim 7 wherein said retaining fingers are formed with a pair of confronting semi-circular recesses adapted for engagement with said recess in said pin.

9. The invention as set forth in claim 8 wherein said recesses on said retaining fingers are formed with semi-circular confronting boss portions adapted for engagement with said recess in said pin.

10. The invention as set forth in claim 7 which includes an anti-wear clip interposed between said retaining fingers and the periphery of said pin.

11. The invention as set forth in claim 1 which includes positioning means on said insert member for aligning the same with respect to said opening in said yoke member.

12. The invention as set forth in claim 11 wherein said positioning means includes a transversely extending positioning element extending downwardly from the underside of said insert member and extending transversely between the inner sides of said side sections of said yoke member.

13. The invention as set forth in claim 11 wherein said positioning means comprises a longitudinally extending positioning element adapted for engagement with one longitudinal end of said opening in said yoke member.

14. The invention as set forth in claim 1 wherein said wiper arm includes an end fitting adapted for engagement with a hook-shaped terminus portion of said arm.

15. The invention as set forth in claim 1 wherein one end of said insert member includes a recess adapted to nestingly receive an adjacent peripheral edge portion of said opening in said yoke member and wherein the opposite end of said insert member is adapted to be pivoted into engagement with an opposite peripheral edge portion of said opening.

16. The invention as set forth in claim 1 wherein said connector pin includes a threaded portion.

17. The invention as set forth in claim 1 wherein said pin is cooperable with an anciliary connector member securing the pin to said yoke member and insert member.

18. The invention as set forth in claim 17 wherein said anciliary connector member comprises a cotter pin.

19. The invention as set forth in claim 17 wherein said anciliary connector member comprises a circlip.

* * * * *